Patented July 28, 1931

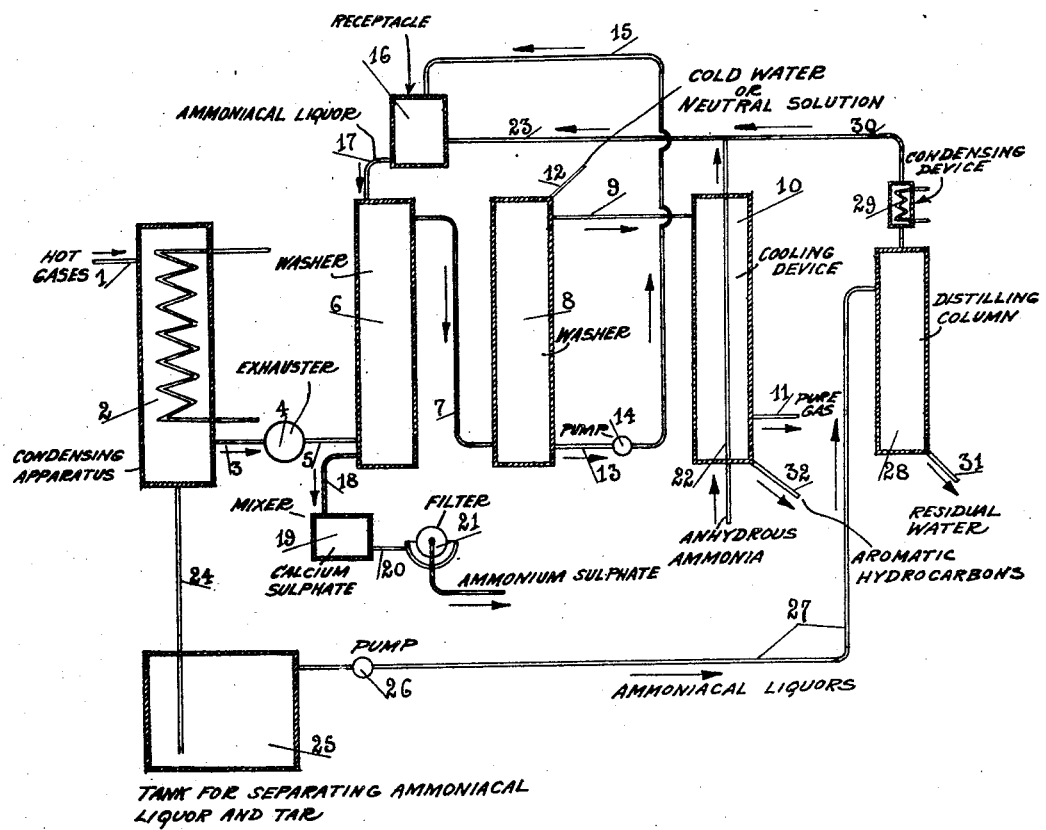

1,816,123

UNITED STATES PATENT OFFICE

FRITS ADOLPHE FRANÇOIS PALLEMAERTS AND ALPHONSE IVAN LEBRUN, OF BRUSSELS, BELGIUM, ASSIGNORS TO UNION CHIMIQUE BELGE, SOCIETE ANONYME, OF BRUSSELS, BELGIUM

PRODUCTION OF AMMONIUM SULPHATE

Application filed February 28, 1929, Serial No. 343,487, and in Belgium July 24, 1928.

This invention relates to the treatment of cold coke oven or like gases, such as those leaving the cooling apparatus in which the condensation of tar and of ammoniacal liquor is effected.

It has been found that the anhydrous ammonia prepared by synthesis from hydrogen obtained from coke oven gas, is particularly suited for saturating all the acid compounds contained in the coke oven gases. The solution thus obtained and containing mainly ammonium carbonate, can react with calcium sulphate to produce ammonium sulphate.

According to the present invention the gases to be treated are washed, after they have left the apparatus in which the condensation of tar and of ammoniacal liquor takes place, with a solution which has been rendered alkaline by the absorption of ammonia.

It is thus possible to effect the elimination of all the acid compounds contained in the cold gases, and to effect afterwards, by means of calcium sulphate, the sulfatation of the ammonia contained in the ammoniacal solution.

Prior to the washing, the ammoniacal solution is advantageously utilized for absorbing the ammonia liberated in the distilling columns serving for the treatment of the ammoniacal liquor obtained by cooling the hot gases treated. The acid gases liberated in the same operation and containing carbonic acid form a new source of ammonium carbonate suitable for the sulfatation by means of calcium sulphate.

Moreover, as the evaporation of anhydrous ammonia produces an absorption of heat, use is made of this fact for withdrawing benzol-containing liquid hydrocarbons from the gas from which the acid and alkaline compounds were eliminated.

The process may be carried into effect, in the manner indicated hereinafter by means of an apparatus such as shown diagrammatically in the accompanying drawing.

The hot gases from the batteries of coke ovens enter through a conduit 1 into a condensing apparatus 2, which they leave in a cold state through a pipe 3 and arrive to an exhauster 4.

The cold gas under the required pressure enters through a pipe 5 into a washer 6, where it is brought into contact with an ammoniacal solution fed through a tube 17 connected with a receptacle 16. This solution absorbs the acid impurities contained in the gas, and flows through a pipe 18 into a mixing apparatus 19 where it is mixed with finely pulverized calcium sulphate in suspension. A double decomposition takes place between the calcium sulphate and the ammoniacal salts contained in the ammoniacal water, with production of sulphate of ammonium and calcium salts, mainly calcium carbonate.

The solution is separated in the filter 21 from the insoluble matter, and can be further treated in any known manner.

The gas which leaves the washer 6 is charged with volatile ammonia. It is sent through a pipe 7 into a washer 8 which is fed through a tube 12 with a neutral, cold liquid which may be water or a solution of ammonium sulphate. The gas thus freed from its acid and alkaline compounds escapes through a conduit 9 and enters the cooling device 10 which is traversed by a cooling tube 22 fed with anhydrous ammonia which acts as a cold producing source. The cooling to which the gas is subjected produces a condensation of hydrocarbons of the benzol series, which flow out through a tube 32. The gas which leaves the conduit 11 is perfectly well purified and is freed from benzol.

The ammonia which leaves the cooling tube 22 is sent through a tube 23 into a receptacle 16 in which it is dissolved by the liquid which is sent therein through the compression pipe 15 of a pump 14 connected at 13 with the washer 8. A distinctly alkaline solution is thus obtained in the receptacle 16, which is capable of completely absorbing the acid impurities of the gases.

The ammoniacal liquor which, together with the tar, is condensed in the cooling device 2, flows through the pipe 24 into a tank 25, from which after settling of the residue, it is taken by a pump 26 and sent through a pipe 27 into a distilling apparatus 28.

The volatile compounds of this ammoniacal liquor are cooled in a condensing device 29 and flow out through a tube 30, which is connected with the ammonia tube 23. The residual water from the distilling column 28 flows through a pipe 31.

We claim:

1. A process for the treatment of coke oven gases consisting in cooling the coke oven gases, distilling the liquid condensate thus obtained and cooling the volatile compounds obtained by said distillation, treating them with anhydrous ammonia and sending them together with an alkaline liquor to a washer for the purpose of washing the coke oven gases which have been cooled, treating the liquid portion obtained therefrom with gypsum, as set forth.

2. A process for the treatment of coke oven gases consisting in cooling the coke oven gases, distilling the liquid condensate thus obtained and cooling the volatile compounds obtained by said distillation, treating them with cold anhydrous ammonia and sending them together with an alkaline liquor to a washer for the purpose of washing the coke oven gases which have been cooled, treating the liquid portion obtained therefrom with gypsum, sending the gases leaving the said washer into another washer which is fed with a neutral, cold solution, and subjecting the gases leaving the second washer to a cooling, as and for the purpose set forth.

3. A process for the treatment of coke oven gases consisting in cooling the coke oven gases, distilling the liquid condensate thus obtained and cooling the volatile compounds obtained by said distillation, treating them with cold anhydrous ammonia and sending them together with an alkaline liquor to a washer for the purpose of washing the coke oven gases which have been cooled, treating the liquid portion obtained therefrom with gypsum, sending the gases leaving the said washer into another washer which is fed with a neutral, cold solution, subjecting the gases leaving the second washer to cooling, sending the liquid obtained from the second washer into a receptacle where the anhydrous ammonia is also introduced, and sending the mixture thus obtained into the first washer, as and for the purpose set forth.

FRITS ADOLPHE FRANÇOIS PALLEMAERTS.
ALPHONSE IVAN LEBRUN.